March 12, 1968
P. A. DOLTER
3,372,709
ZONE VALVE
Filed Sept. 13, 1965
2 Sheets-Sheet 1
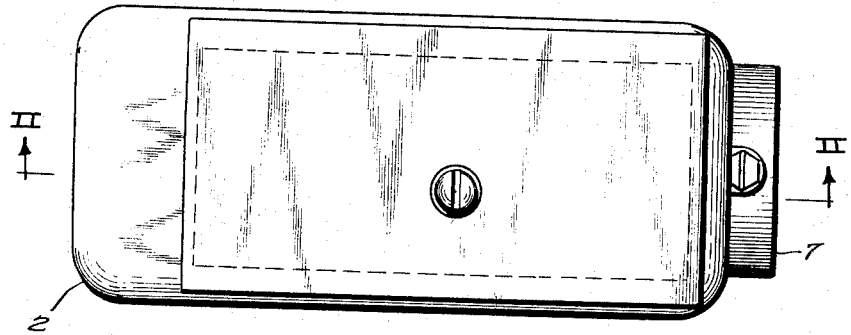
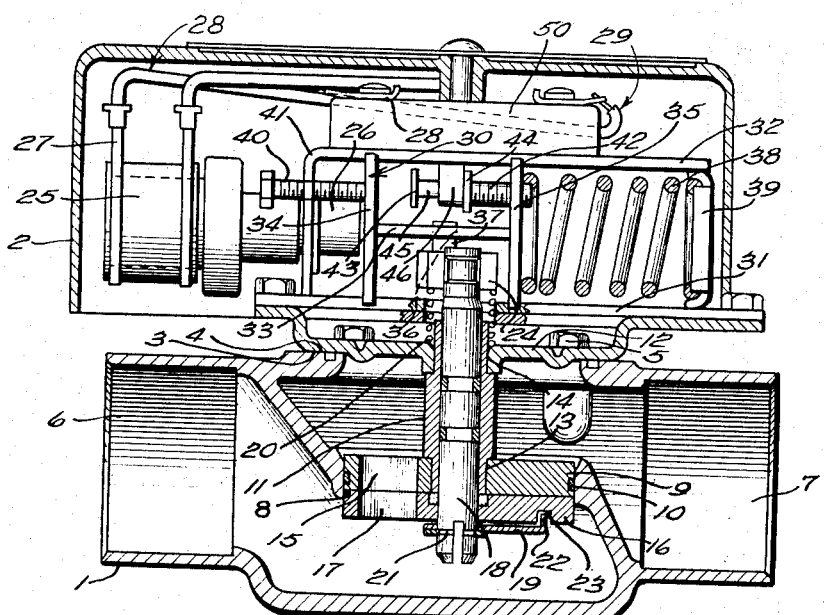
INVENTOR.
Paul A. Dolter
BY
ATTORNEYS

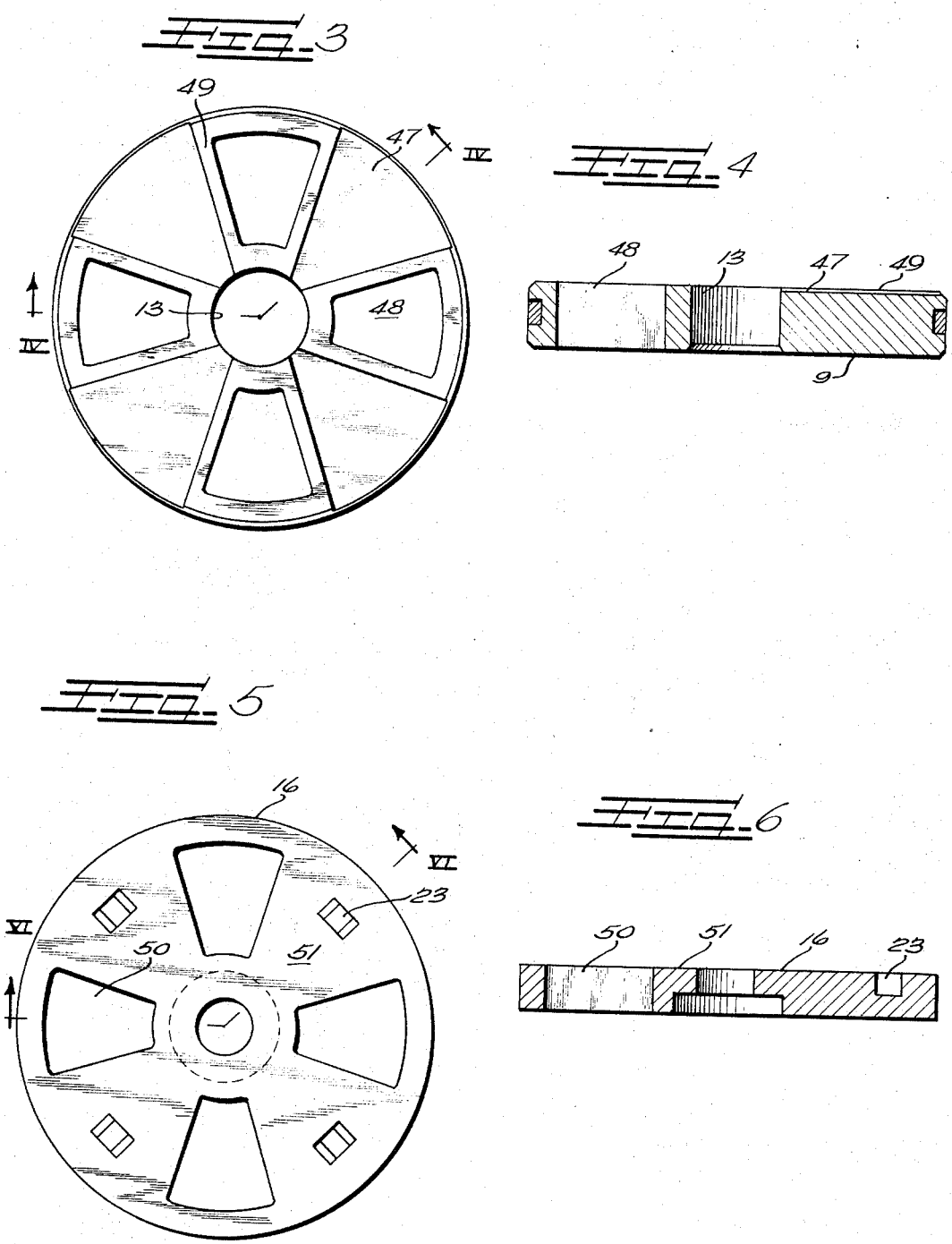

United States Patent Office 3,372,709
Patented Mar. 12, 1968

3,372,709
ZONE VALVE
Paul A. Dolter, Roselle, Ill., assignor to The Dole Valve
Company, Morton Grove, Ill., a corporation of Illinois
Filed Sept. 13, 1965, Ser. No. 486,668
4 Claims. (Cl. 137—625.31)

ABSTRACT OF THE DISCLOSURE

A fluid control valve having a pair of rotary valve members which move relative to each other to cover and uncover flow ports therein to control the flow of fluid from an inlet to an outlet. The rotary action of the valve members is accomplished by means of a thermal power unit which operates on a torque arm to generate the rotary motion required. The valve members have flow ports which may be either aligned to open the valve or misaligned to close the valve. Raised lands are formed about each of the flow ports on one of the valve members, and a constant biasing means is exerted between the valve members to maintain a fluid seal at the raised lands.

---

This invention relates to a fluid flow control valve and in particular to a zone valve having a novel flow control structure.

The use of a single thermostat or other temperature regulating means has not proven entirely satisfactory for stabilizing temperatures in distant rooms of large homes or office buildings. As a solution it has been found necessary to employ a separate device for controlling the heat flow to individual areas or to a series of adjacent or adjoining areas which may be referred to as control zones.

However, installing a new zone heating system or converting a current heating facility to a zone control system tends to be comparatively costly in view of the fact that separate valve power units must be employed with each device, and further that these power units must be capable of controlling relatively high fluid pressures within the system.

To reduce the cost of zone heating, a sliding type valve has been employed which is effective for lowering the power requirements of the control motor. In particular, by sliding one valve member relative to another for opening a flow port, high fluid pressures acting at the valve surface can be substantially discounted.

Currently, sliding valves have generally taken the form of a pair of relatively rotating valve disks, each having port and land areas which may be aligned or non-aligned for permitting or obstructing the free flow of fluid within the system. Heretofore, it has been accepted that in this type of valve the land areas of one disk must at least equal the port areas of the cooperable disk for closing the flow passageway.

It has been found, however, that large land areas interfere with certain operational features of the zone valve and, especially, inhibit a reduction of the size and, hence, the cost of the power unit employed. For instance, large land areas develop frictional forces in regions that place high torque requirements on the rotating member. In addition, to provide a pressure seal between the rotating disks the respective land areas must be highly machined. A slight mar on the cooperating faces, as may be incurred during assembly or by foreign particles during operation, can appreciably affect the sealing feature of the valve.

Therefore, it is an object of this invention to provide a thermostatically operated fluid control valve having a significantly reduced operational power requirement.

It is another object of his invention to provide a zone valve having relatively rotating valve members with substantially reduced contacting surfaces.

It is a further object of this invention to provide a zone valve having relatively rotating valve members and having substantially reduced contact areas outwardly of the axis of rotation.

It is an additional object of this invention to provide a zone valve having relatively rotating valve members which are significantly less susceptible to damage either during manufacture or during operation.

These and other objects, features and advantages of the present invention will be understood in greater detail from the following description and the associated drawings wherein reference numerals are utilized in designating a preferred embodiment and wherein:

FIGURE 1 is a top view of the zone valve of this invention and emphasizes the external configuration thereof;

FIGURE 2 is a sectional view taken along the lines II—II of FIGURE 1 showing the internal features of the zone valve;

FIGURE 3 is a bottom view of the upper valve disk or seal plate as used in the structure of FIGURE 2;

FIGURE 4 is a sectional view of the seal plate as taken along the lines IV—IV of FIGURE 3;

FIGURE 5 is a bottom view of the lower valve disk or control plate as shown in the environment of FIGURE 2; and FIGURE 6 is a sectional view of the control plate as taken along the lines VI—VI of FIGURE 5.

A preferred embodiment of the zone valve of this invention is shown generally in FIGURES 1 and 2 as having a thermal power unit disposed within a control housing for actuating a pair of relatively movable valve disks disposed within an adjoining valve body. One disk is fixedly mounted within the valve body at an opening formed perpendicular to the planes of the inlet and outlet. A second disk is maintained contiguous with the upstream surface of the first disk and is keyed to a valve stem extending through the first disk and into the control housing for being linked to the thermal power unit.

The seal plate, which is the fixedly mounted disk, and the control plate, which is relatively movable therewith, are provided with a plurality of radially disposed ports and adjacent land areas. By rotating the control plate these ports may be aligned or non-aligned for determining the flow rate through the system. This rotation is accomplished by the thermal power unit.

Here, a unique structure is provided for the seal plate which enables the use of a substantially smaller and less costly power unit. This structure takes the form of raised lands formed about the periphery of each of the flow ports such that the contact area with the control plate is greatly reduced. Due to the radial configuration of these ports, this reduction in contact area is maximized outwardly and minimized inwardly of the disk. In this way, then, frictional forces associated with the rotation of the control plate are disproportionately redistributed to points inwardly of the center of rotation. However, since torque equals the frictional force times its moment arm, the redistribution of the frictional forces inwardly of the rotating disk results in a corresponding reduction in torque. It is this reduction in torque that permits the use of a smaller, less costly power unit.

Referring to these figures in greater detail, it can be seen that the zone valve of FIGURE 2 comprises a valve body 1 and a control housing 2 which are securely assembled at cooperable faces 3 and 4 by a plurality of fasteners 5. The valve body holds the valve disks which control the flow of fluid through the system, while the control housing contains the thermal power unit and the means for engaging and rotating these disks.

Specifically, the valve body is provided with an inlet 6, an outlet 7, and a port 8 formed intermediate of and perpendicular to the respective inlet and outlet. The upper valve disk or the seal plate 9 is fixedly mounted within the port 8 and is provided with a ring 10 for forming a pressure seal therewith. To further secure the mounting of the seal plate 9, a sleeve 11 is disposed between the plate and the base 12 of the control housing 2. In particular, the sleeve 11 is fixedly secured within a center bore 13 of the plate 9 and within an actuation opening 14 formed centrally of the base 12 of the control housing. In this way, both the lateral and axial position of the plate 9 within the port 8 is fixed.

The seal plate 9, as mounted within the port 8, displays a series of radially arranged flow ports 15, and it is the opening and the closing of these ports that determines the rate of flow from the inlet 6 to the outlet 7 and, hence, through the connecting system.

To regulate the closure of the flow ports 15, a second valve disk or control plate 16 is disposed to be cooperable with the seal plate 9. The control plate 16 is provided with a series of flow ports 17 which may be aligned or non-aligned with the ports 15 by rotating the plate 16. It can be understood that alignment of the ports 15 and 17 will correspond to a maximum flow, while non-alignment will result in zero flow. It is also apparent that all angular positions of the control plate between alignment and non-alignment will permit a partial flow for satisfying the heating demands of the system thermostat.

The control plate 16 is maintained contiguous with the upstream surface of the plate 9 through the cooperable provisions for a torque shaft 18, a key plate 19 and a coil spring 20. In particular, the control plate 16 is loosely fitted about the lower portion of the shaft 18 which, in turn, is rotatably received internally of the sleeve 11. The key plate 19 is snap-fitted within a groove 21 formed about the shaft 18 and thereby limits the axial location of the control plate 16. In addition, the key plate 19 has an upwardly turned lip 22 received within a key-way 23 formed at the lower surface of the control plate 16. Therefore, torque applied to the shaft 18 is transmitted to the control plate 16 through the lip 22 for regulating the alignment or non-alignment of the flow ports 15 and 17.

The entire assembly comprising the shaft 18, the key plate 19 and the control plate 16 is biased against the upstream surface of the seal plate 9 by a coil spring 20 which is disposed between the housing base 12 and a collar 24 extending radially of and locked to the shaft 18. While the spring 20 maintains the necessary bias between the plates 9 and 16 for providing a pressure seal at the contacting surfaces, it merits noting that the plate 16 is disposed at the upstream side of the valve connection such that the water head at the inlet 6 adds to the maintenance of this seal.

The torque shaft 18 and, therefore, the control plate 16 is actuated by a thermal power unit 25 disposed within the control housing 2. The unit 25 is provided with a relatively extensible power member 26 and is controlled by an electric heating coil 27 which is wound about the base of the thermal element and which is connected through leads 28 and 29 to an external circuit employing an area thermostat. This thermostat is provided to increase or decrease the heating of the coil 27 according to the temperature of the controlled environment. In this way the temperature of the controlled environment is functionally tied to the movement of the extensible power member 26.

The relatively extensible power member 26 provides the fundamental motion to rotate the torque shaft of this invention and align the ports 15 and 17. However, a transition must be accomplished from the translational motion of the power member to the rotary motion required at the shaft 18. Here, this transition is accomplished by the use of an H-shaped translation member 30 which is slidably received between guide rails 31 and 32.

The H-shaped translation member 30 consists of a horizontal plate 33 which is disposed intermediate supporting legs 34 and 35 and which is provided with a carriage slot 36. As was noted, the radially enlarged collar 24 acts as a seat for the coil spring 20, however, the collar 24 also supports an actuation lever 37 which is received within the carriage slot 36. The lever 37 is sufficiently radially distant from the axis of the shaft 18 to develop a significant moment about that axis when engaged by the plate 33. It is understood, therefore, that translation of the H-shaped member 30 is transformed into a rotary motion at the shaft 18 for actuating the control plate 16.

To cause the power member 26 to retract during the cooling of the coil 27, a bias is provided in the form of a coil spring 38 disposed intermediate a spring locater 39 and the supporting leg 35 of the translation member 30.

In addition, means are provided to assure that the translation of the power member 26 does not overstep the necessary movement required for opening or closing the control plate 16. Due to the repetitive circuitry of the port and land areas of the control plate 16, the valve may be both opened and closed by a motion of the power member 26 in a single direction. Therefore, suitable means are required to eliminate the overshoot of the translation member which would bring about the opposite of the desired response.

Such a means is provided in the form of a switch 50 having a switch actuator 46 extending therefrom. In particular, when the thermostat in the controlled environment calls for heat, it makes an electrical contact and allows a current to flow to the wire leads 28 and 29 of the switch 50. The heater coil 27 is then energized and the power member 26 extends from the casing 25 to actuate the translation member 30, for aligning the ports 15 and 17.

In moving, the translation member 30 carries the switch actuator 46 via an adjustment screw 42. When the translation member 30 has reorientated corresponding to an alignment of the ports 15 and 17, the switch 50 will break the current to the heater coil 27. As a result the heater coil 27 cools and the member 30 retracts. Upon retracting the actuator will again cause current to flow to the coil 27. The process then repeats such that the coil 27 will be pulsing on and off, maintaining the travel of the heat responsive element corresponding to an opening of the ports 15 and 17.

When the thermostat senses that the environment is at its proper value, it interrupts the current to the switch 50. The heat responsive element then cools, closing the ports 15 and 17.

In the instance of a power failure or the like, the ports 15 and 17 may be manually aligned by turning a screw 40 which is threadedly received within a right angle leg 41 of the rail 32. In this way heat flow to the control environment is assured.

Referring to the seal plate and control plate in greater detail, it can be seen in FIGURE 3 that the seal plate 9 is provided with land areas 47 and port areas 48. Important here is that the plate 9 is also provided with *raised* land areas 49 formed about the periphery of each flow port. In comparison with the control plate of FIGURE 5 which is provided with similar flow ports 50 and land areas 51, it can be seen that rotation of that plate will develop frictional forces only in the vicinity of the raised land areas 49. Also, it can be seen that the contact region has been disproportionately reduced inwardly and outwardly of the disk center with the greatest reduction occurring outwardly thereof. Since frictional forces occur equally per unit area, this reduction results in a redistribution of forces inwardly of the disk. As explained, such a redistribution generates a lower torque requirement for the thermal power unit.

In addition to the reduction in torque associated with the raised land areas 49, it is also apparent that the possibilities of damaging the contact surfaces during assembly or repair have been greatly reduced. It is likewise apparent that the possibility of interference between the contacting surfaces by rust or dirt particles accumulated during operation has been greatly minimized.

It will be understood that various modifications may be suggested by the embodiment disclosed, but I desire to claim within the scope of the patent warranted hereon, all such modifications as come within the scope of my invention.

I claim as my invention:

1. A fluid control valve comprising:
    a valve body having an inlet and an outlet and a flow passageway connecting said inlet and said outlet,
    a seal plate fixedly secured within said flow passageway for having an inlet-facing surface and an outlet-facing surface,
    a first flow port formed within said seal plate for communicating said inlet with said outlet,
    a raised land formed circumferentially of said first flow port at said inlet-facing surface of said seal plate,
    a control plate maintained contiguous with said seal plate at said raised land and having a second flow port formed therein,
    said raised land providing a fluid pressure seal at the region of contact with said control plate and holding the remaining regions of said control plate in spaced relation with said inlet-facing surface of said seal plate,
    means for rotating said control plate relative to said seal plate to move said first and second flow ports into and out of alignment for opening and closing communication between said inlet and said outlet fluid pressure from said inlet biasing said control plate against said raised land of said seal plate when said first and second flow ports are closed, and means continually biasing said seal plate and control plate into firm engagement with one another at said raised land.

2. A fluid control valve in accordance with claim 1 wherein said means for rotating said control plate relative to said seal plate comprises a thermally responsive power unit disposed within said valve body and having a relatively extensible power member extending therefrom and wherein means are provided to interconnect said relatively extensive power member and said control plate for rotating the same.

3. A fluid control valve in accordance with claim 2 wherein said means interconnecting said relatively extensible power member and said control plate comprises a torque arm keyed to said control plate and means interconnecting said relatively extensible power member and said torque arm for converting translation motion of said power member to rotary motion of said torque arm.

4. A fluid control valve comprising:
    a valve body having an inlet and an outlet and a flow passageway connecting said inlet and said outlet,
    a seal plate fixedly secured within said flow passageway for having an inlet-facing surface and an outlet-facing surface,
    a plurality of flow ports formed within said seal plate for communicating said inlet with said outlet,
    said inlet-facing surface of said seal plate having raised lands formed circumferentially about each of said plurality of flow ports formed therein,
    a control plate maintained contiguous with said seal plate at said raised lands and having a plurality of control ports formed therein,
    said raised lands providing a fluid pressure seal at the region of contact with said control plate and holding the remaining regions of said control plate in spaced relation with said inlet-facing surface of said seal plate,
    said raised lands having a minimal surface area relative to the total area of said inlet-facing surface of said seal plate,
    means for rotating said control plate relative to said seal plate to move said plurality of flow ports and said plurality of control ports into and out of alignment for opening and closing communication between said inlet and said outlet fluid pressure from said inlet biasing said control plate against said raised land of said seal plate when said first and second flow ports are closed, and means continually biasing said seal plate and control plate into firm engagement with one another at said raised lands.

References Cited

UNITED STATES PATENTS

| | | | |
|---|---|---|---|
| 2,744,540 | 5/1956 | Erle | 251—283 X |
| 2,832,561 | 4/1958 | Holl | 251—283 X |
| 3,149,641 | 9/1964 | Norton | 251—282 X |
| 3,246,667 | 4/1966 | Pemberton | 137—625.11 X |
| 3,273,850 | 9/1966 | Kolze | 251—11 |

ROBERT A. O'LEARY, *Primary Examiner.*

W. E. WAYNER, *Assistant Examiner.*